UNITED STATES PATENT OFFICE.

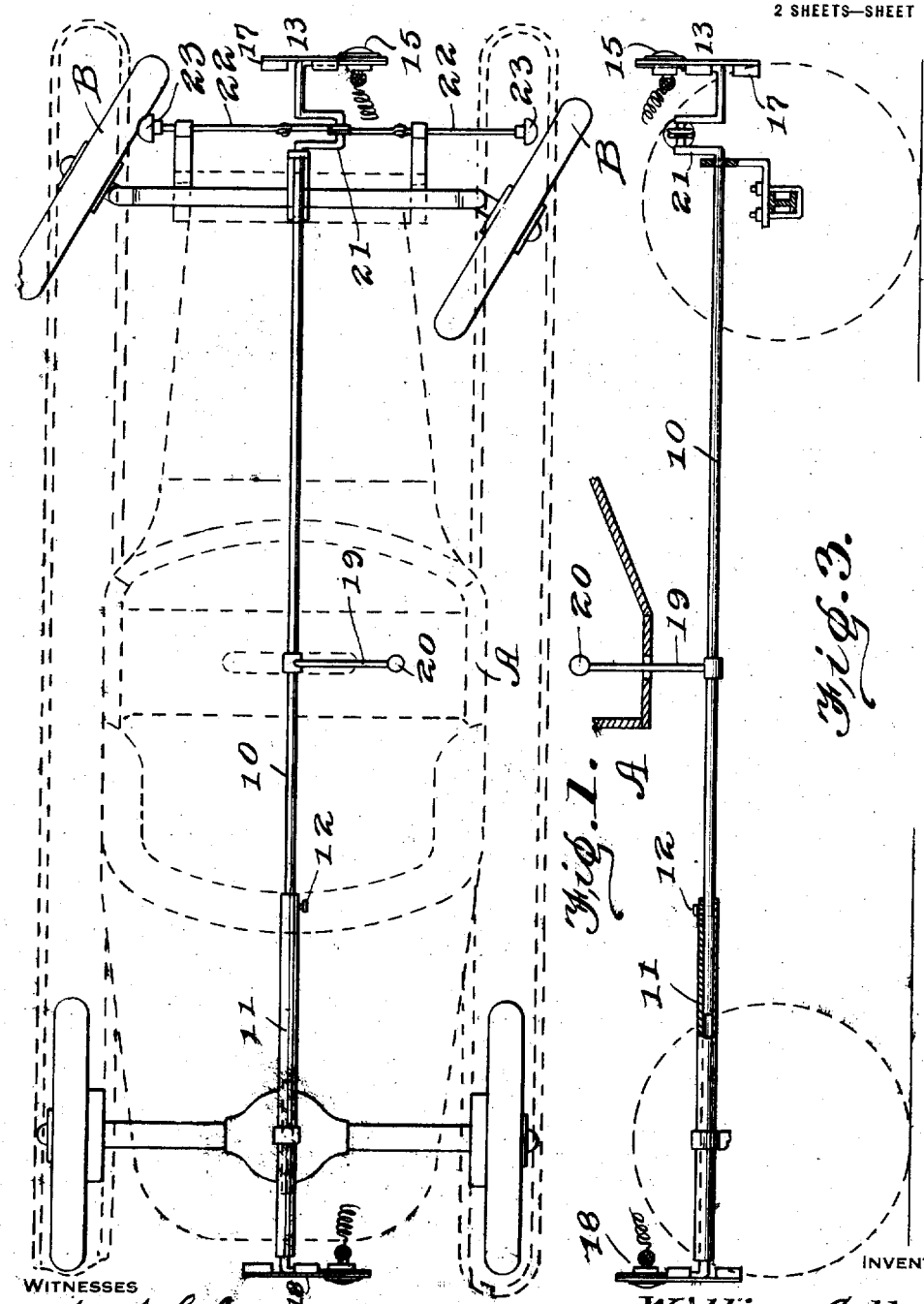

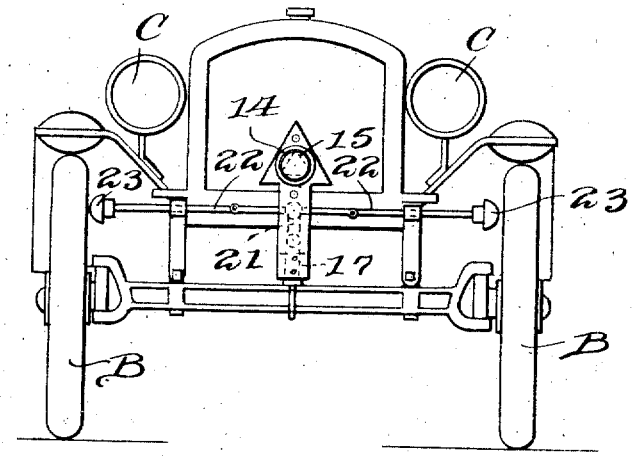
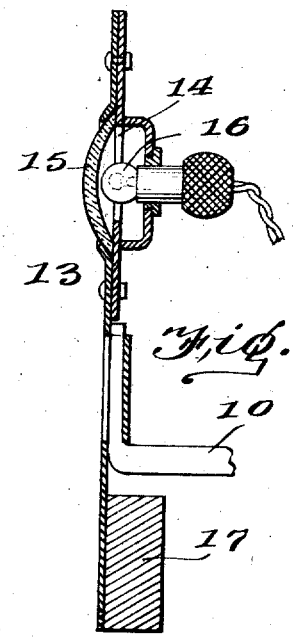
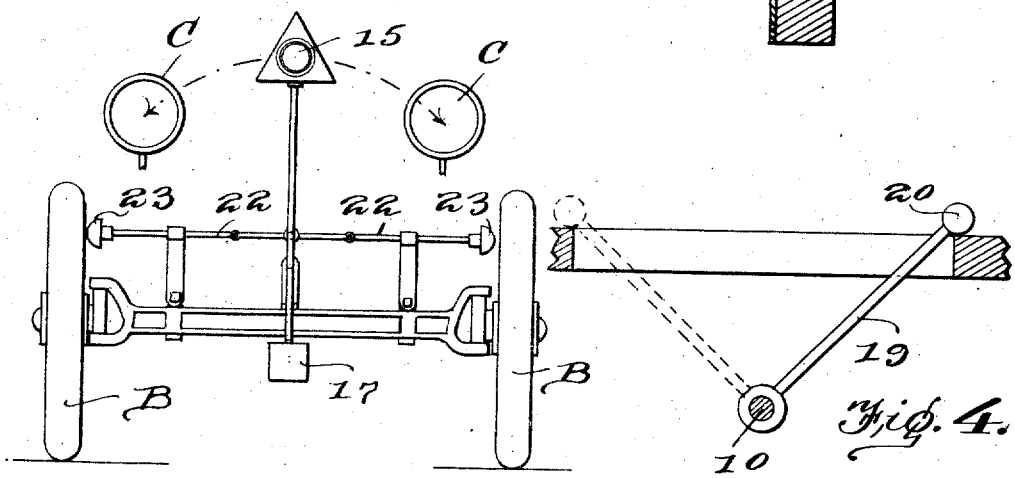

WILLIAM COLLETTE, OF SPRINGFIELD, MASSACHUSETTS, ASSIGNOR OF ONE-HALF TO JOHN H. CLUNE, OF SPRINGFIELD, MASSACHUSETTS.

AUTOMOBILE-SIGNAL.

1,257,189.

Specification of Letters Patent.

Patented Feb. 19, 1918.

Application filed February 2, 1917. Serial No. 146,166.

*To all whom it may concern:*

Be it known that I, WILLIAM COLLETTE, a citizen of the United States, residing at Springfield, in the county of Hampden and State of Massachusetts, have invented new and useful Improvements in Automobile-Signals, of which the following is a specification.

This invention relates to vehicle signals and is especially designed for use in connection with automobiles or other self propelled vehicles.

The primary object of the invention is the provision of a signal which may be either manually or automatically operated for the purpose of indicating to others the direction in which the vehicle is turning or about to turn.

A further object of the invention is the provision of means by which the direction of the turning of the vehicle is simultaneously indicated at both the front and the rear ends thereof, in order that persons either in front or behind the vehicle may be made aware of the intentions of the driver.

A still further object of the invention is the provision of a signal which is automatic in resetting and which is susceptible of adjustment in order that it may be applied to vehicles of various makes and sizes.

Still another object of the invention is to provide a signal consisting of few operative parts, in order that it may be cheaply manufactured and to reduce the danger of the working parts of the vehicle becoming disarranged or out of order, thereby insuring positive operation.

Referring to the drawings:—

Figure 1 is a plan view of the vehicle having the improved signal applied thereto, the body of the vehicle being shown in dotted lines in order to more clearly expose the working parts of the signal, the front wheels of the vehicle being shown in the turning position;

Fig. 2 is a front elevation of the same with the vehicle and signals in their normal position;

Fig. 3 is a longitudinal sectional view with the parts in the position shown in Fig. 2;

Fig. 4 is a transverse sectional view on the line 4—4 of Fig. 1;

Fig. 5 is a detailed longitudinal sectional view through one of the arrows or signals; and Fig. 6 is a front elevation of the modified form of signal illustrating the manner of utilizing the headlights of the vehicle.

Referring in detail to the drawings the body of the automobile is indicated at A and the front wheels at B, while the headlights are shown at C.

The improved signal comprises an extensible rod composed of the telescopic sections 10 and 11, which are adapted to be secured in adjusted position by means of a set screw or other fastening device 12. This rod is adapted to be secured beneath the body of the car in any desired manner, or it may be secured upon the axles of the vehicle. The section 10 carries at its outer end a signal 13 which is in the form of an arrow and adapted to be secured to the end of the section by any suitable means. The head of the arrow is provided with an opening 14, over which is secured a lens 15, and back of this lens there is provided a light 16 which may be electrically operated from any suitable source. The arrow 13 is further provided with a counterbalance weight 17 by means of which the said arrow or signal is automatically returned to its normal or inoperative position. The section 11 carries an arrow 18 similar in construction and operation to the arrow 13, this arrow being adapted to be mounted at the back of the vehicle in a position to be conveniently seen.

In order to operate the arrows or signals 13 and 18, the section 10 is provided with a laterally extending rod 19 which has secured thereto and is pivotally mounted upon its outer or upper end a foot piece 20, the said rod extending through an opening or slot in the bottom of the vehicle body in order that the foot piece may be within convenient reach of the driver.

It will be seen from the foregoing that when the rod 19 is moved either to the right or left, the arrows or signals 13 and 18 will be moved in a similar direction, thereby indicating to others the direction in which the vehicle is about to turn.

In order to provide for the automatic operation of the signals, the section 10 is formed with a crank or offset portion 21 and pivotally secured to this portion are a pair of oppositely extending rods 22, mounted in sliding bearings secured to any convenient part of the vehicle. Rollers 23 are rotatably mounted upon the outer ends of the rods 22, these rollers being preferably formed of rubber and are adapted to contact with the front wheels B of the vehicle when they are turned. The lengths of the rods 22 are so adjusted that when the vehicle is traveling straight ahead they will not contact with the wheels B, but as soon as the wheels are turned in either direction their rims will engage the rollers 23 and shift the rods, thereby turning the extensible rod and operating the signals.

The right is reserved to make such changes in the form and proportion of the invention as will suggest themselves, for example, the arrow or signal 13 located at the front end of the vehicle may be of such length as to move into the path of the headlights C, thereby dispensing with the necessity of providing a light upon the signal. This form of invention is illustrated in Fig. 6.

It is believed from the foregoing that the construction, operation and advantages of the invention will be perfectly clear to those skilled in the art, and that a further description is unnecessary.

Having described the invention, what I claim, is;

1. The combination with a vehicle, of a rotatably mounted shaft disposed longitudinally of the vehicle, a signal mounted upon the shaft and operable for rotation upon the latter and laterally extending means secured to the shaft and positioned for contact with the front wheels of the vehicle, whereby when the vehicle is turned the shaft will be rotated to operate the signal.

2. The combination of a vehicle, of a rotatably mounted shaft disposed longitudinally of the vehicle, a signal arm mounted upon said shaft and operable upon rotation of the latter and laterally extending arms pivotally secured to the shaft and positioned for contact with the front wheels of the vehicle, whereby when the vehicle is turned the shaft will be rotated to operate the signal.

3. The combination with a vehicle of a rotatably mounted shaft disposed longitudinally of the vehicle, a signal mounted upon said shaft and operable upon rotation of the latter, a crank arm carried by the shaft and transversely movable arms pivotally connected to the crank arm and positioned for contact with the front walls of the vehicle, whereby when the vehicle is turned the shaft will be rotated to operate the signal.

In testimony whereof I affix my signature.

WILLIAM COLLETTE.